United States Patent [19]
Valverde

[11] 3,709,448
[45] Jan. 9, 1973

[54] FISHING ROD HOLDER

[75] Inventor: Manuel Valverde, Seymour, Ind. 47274

[22] Filed: April 6, 1970

[21] Appl. No.: 26,024

[52] U.S. Cl. .................................................248/46
[51] Int. Cl. ............................................A01k 97/10
[58] Field of Search ..........................248/38–44, 46, 248/83–88

[56] References Cited

UNITED STATES PATENTS

| 994,005 | 5/1911 | Jones | 248/88 |
| 2,720,371 | 10/1955 | Campbell | 248/85 |

FOREIGN PATENTS OR APPLICATIONS

| 1,109,773 | 9/1955 | France | 248/44 |
| 1,542,603 | 9/1968 | France | 248/46 |

Primary Examiner—William H. Schultz
Attorney—Woodard, Weikart, Emhardt & Naughton

[57] ABSTRACT

A device for supporting and holding a fishing pole. The fishing rod holder is composed of a pair of parallel legs which are separated by an overlapping bar. A supporting bar is rotatably mounted between the pair of parallel legs. Rotatably mounted to the supporting bar are angular legs. The fishing rod is supported on the bottom by the supporting bar and held on the top by the overlapping bar. Spikes are formed in the ends of the legs to allow insertion of the legs into the ground.

1 Claim, 3 Drawing Figures

PATENTED JAN 9 1973

3,709,448

INVENTOR
MANUEL VALVERDE
BY
Woodard, Weikart, Emhardt & Naughton
ATTORNEYS

FISHING ROD HOLDER

BACKGROUND OF THE INVENTION

1. Field of the Invention

This invention relates to a fishing rod holder. The fishing rod device holds the rod without continuous adjustment by the user.

2. Description of the Prior Art

In fishing from the bank of a stream or pond with a rod and reel, it is often desirable to have a means for supporting the rod and reel while waiting for a fish to bite. Supports of this type are desirable because it relieves the individual of the tiring task of manually holding the rod and reel and it keeps the rod and reel off the ground. The latter mentioned advantage is particularly important when using modern equipment such as delicate reels and that these reels are kept out of contact with abrasive materials such as sand. In contrast, if a rod and reel were allowed to lie on the ground, both would become coated with sand and other abrasive materials whereupon when the reel was operated these abrasive materials would completely destroy its delicate mechanism.

Fishing rod supports of a general type of this invention are known in the art. The most common prior art structure generally comprises a Y-shaped twig which is broken off and inserted into the ground. This prior art embodiment while being inexpensive is often undesirable in that is height cannot be readily adjusted and suitable twigs often are not available.

Still other prior art embodiments are illustrated in the U.S. Pat. to Philbrick No. 3,411,231, and the U.S. Pat. to Gaskill No. 2,311,823. These patents are concerned with composite fishing rod holders which are relatively complicated. In particular, it should be noted that the structures of these patents are inherently different from the subject invention in that they are adapted to hold the complete rod structure off the ground. This is to be contrasted with the subject invention, wherein one section of the rod is held off the ground, wherein the other end being biased against the ground in such a manner as to form an oblique angle between the fishing rod and the ground. Two additional fishing rod supports are shown in the U.S. Pat. to Hardy No. 3,037,314 and the U.S. Pat. to Williams No. 3,186,666. Both of these devices are relatively large and involve the use of active components, such as, springs and rollers.

There exists a need for a fishing rod holder which is simple in construction and easy to manufacture and use. The device should be collapsible in order to facilitate storage in a fishing tackle box. In addition, the device should allow for adjustment for the angle and height of the fishing pole when inserted into the ground. The fishing rod holder should be designed to allow the user the opportunity to quickly take the fishing rod off the support.

SUMMARY OF THE INVENTION

The present invention is a fishing rod holder comprising a pair of parallel legs separated by an overlapping bar which passes over the top of the fishing pole handle. Rotatably mounted between the pair of parallel legs is a supporting bar which passes on the lower side of the fishing pole. Angular legs are rotatably mounted to the supporting bar.

It is one object of this invention to provide a fishing rod holder that is inexpensive and simple in construction.

Another object of this invention is to provide a fishing rod holder which is easy to use and which allows the user to quickly take the fishing rod from the support.

A further object of this invention is to provide a fishing rod holder which allows the user to quickly adjust the angle and height of the fishing rod when it is inserted into the support.

Related objects and advantages will be apparent from the drawings, claims and the portion of the specification which follows.

DESCRIPTION OF THE PREFERRED EMBODIMENT

Figure 1:
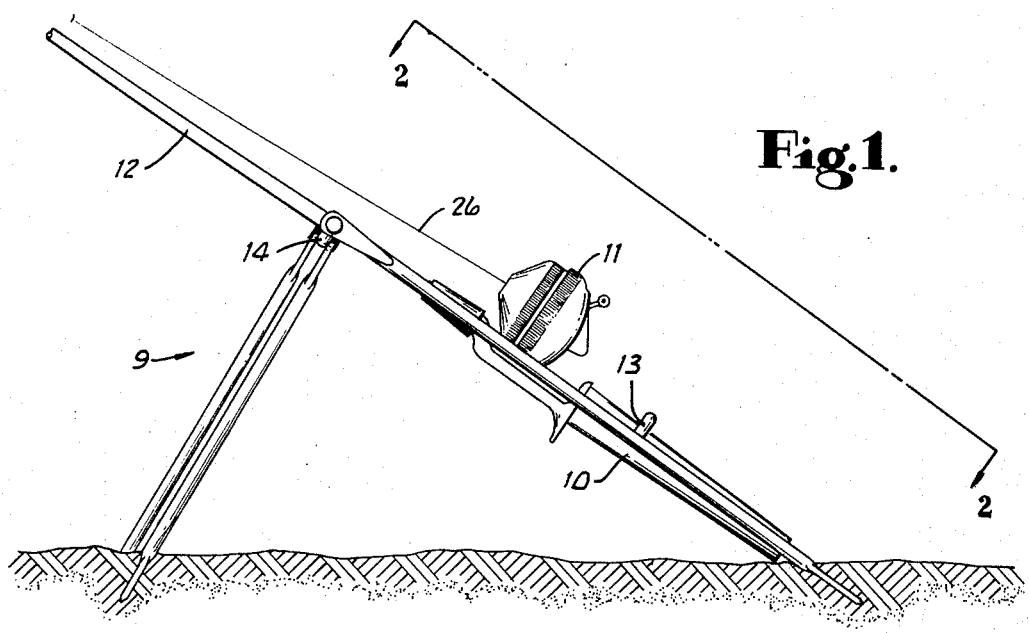
FIG. 1 is a side view of the fishing rod holder holding a fishing pole, reel, and associated handle.

Referring now more particularly to FIG. 1, there is illustrated a fishing rod holder 9 which has mounted thereon a fishing pole 12, a reel 11, and a fishing pole handle 10. The fishing line 26 is shown extending from the reel. Also shown, is an overlapping bar 13 which passes over the fishing pole handle 10. The fishing pole is supported on the bottom by supporting bar 14.

Figure 2:
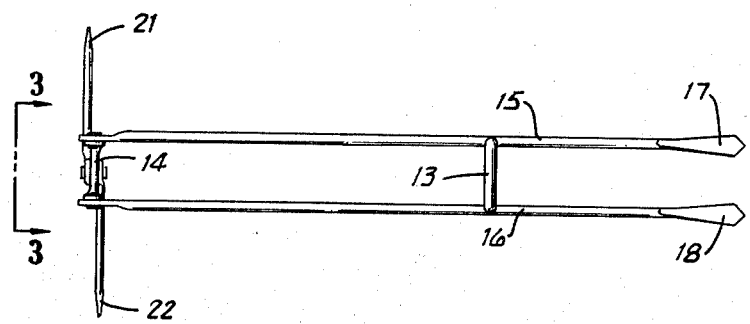
FIG. 2 is a view of the fishing rod holder taken along the line 2—2 of FIG. 1 in the direction of the arrows without the fishing pole, reel, and handle being shown.

FIG. 2 shows a top view of the fishing rod holder 9. A pair of parallel legs 15 and 16 are connected by overlapping bar 13. Stakes 17 and 18 are formed at the ends of legs 15 and 16 to facilitate insertion of the legs into the ground. The overlapping bar 13 should be located approximately 4 inches from the ends of legs 15 and 16 having a staked configuration. Thus, upon insertion of the fishing rod the overlapping bar 13 will be located in such a manner so as to pass over the fishing rod handle 10 without interfering with the reel 11. The overlapping bar 13 is curved in such a manner that is substantially complementary to the curvature of the fishing rod handle 10. Legs 15 and 16 and bar 13 may be made of metal. The bar may be welded to legs 15 and 16.

Figure 3:
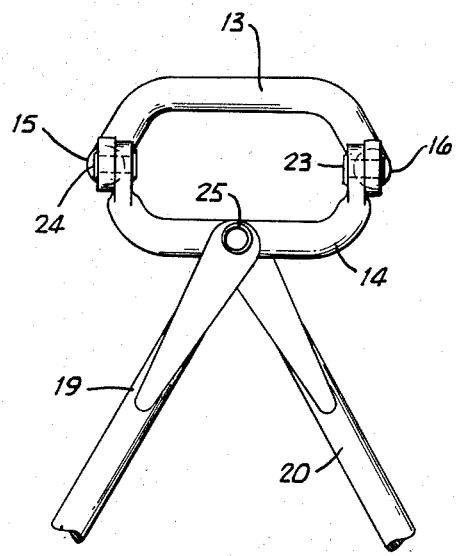
FIG. 3 is an end view of the fishing rod holder taken along the line 3—3 of FIG. 2 in the direction of the arrows.

Located at the left end of legs 15 and 16, as shown in FIG. 2, is supporting bar 14. The purpose of the supporting bar is two-fold. The supporting bar provides a means for connecting all of the legs of the structure together and in addition, the bar supports the fishing pole 12. The supporting bar 14 may be curved upwardly in order to provide a seat for pole 12. Bar 14 is rotatably mounted between legs 15 and 16. FIG. 3 shows the general shape of the supporting bar and shows the bar being rotatably mounted to legs 15 and 16. A fastening device, such as, a rivet, may be used to fasten bar 14 to legs 15 and 16. A pair of angular legs 19 and 20 are rotatably mounted to the center of supporting bar 14 by means of a fastening device 25. The fastening device 25 may be a rivet. Angular legs 19 and 20 have stake shaped ends 21 and 22 to allow for insertion of the legs into the ground. Legs 19 and 20 are rotatably mounted in order that the fishing rod holder may be folded into a compact unit when not in use. In addition, the rotatable mounting allows the user to adjust the angle, shown in FIG. 1, formed by the pair of angular legs and the pair of parallel legs. If the angle included between the pair of parallel legs and the pair of angular legs is small then the fishing rod will be at a large angle with respect to the ground. Likewise, if the fishing rod holder is adjusted so that the angle included between the pair of parallel legs and the pair of angular legs is large then the fishing rod will be at a small angle with respect to the ground. Legs 19 and 20 may be spread apart from each other depending upon the amount of support required.

It will be evident from the above description that the present invention provides a fishing rod holder which is compact and which will easily fit in an average size tackle box. It will also be evident that the present invention provides a fishing rod holder which will allow the user to quickly take the fishing rod from the support. It should be noted that the subject invention is particularly advantageous in that it is very simple in construction thus allowing a low cost item. In addition, it should be noted that the present fishing rod holder will hold any kind of rod, such as, a spin-casting rod, and a cane pole. It will be further evident from the above description that the fishing rod holder has an overlapping bar and a supporting bar to preclude the rod from disengaging the holder as a result of a jerk on the fishing line. In addition, the holder has four legs inserted into the ground in opposite directions to prevent the fish from pulling the holder out of the ground.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A fishing rod holder comprising: a first pair of legs having top ends and bottom ends, said legs being parallel to each other; a second pair of legs; a downwardly curved overlapping bar with ends fastened to said first pair of legs intermediate said top and bottom ends; an upwardly curved supporting bar having ends rotatably mounted between and to said top ends of said first pair of legs, said second pair of legs being rotatably mounted to said supporting bar; said first and second pair of legs having stakes formed at one end; said second pair of legs having top ends rotatably mounted to said supporting bar centrally between said ends of said supporting bar; said top ends of said second pair of legs and said first pair of legs being fastened to said supporting bar by rivets; and, said overlapping bar fixably fastened to said first pair of legs by welds.

* * * * *